United States Patent [19]

Ross et al.

[11] 4,126,395
[45] Nov. 21, 1978

[54] METHOD FOR DETERMINING THE SPATIAL LOCATION OF POINTS ON A SPECULAR SURFACE

[75] Inventors: Joseph A. Ross, Fort Salonga; Howard K. Stern, Greenlawn, both of N.Y.

[73] Assignee: Solid Photography, Inc., Melville, N.Y.

[21] Appl. No.: 800,322

[22] Filed: May 25, 1977

[51] Int. Cl.² ............................................. G01B 11/24
[52] U.S. Cl. .................................. 356/375; 250/558; 356/2; 356/389; 356/390
[58] Field of Search .................. 356/2, 156, 162, 163, 356/170, 171; 250/558

[56] References Cited
U.S. PATENT DOCUMENTS

| | | | |
|---|---|---|---|
| 3,866,052 | 2/1975 | Di Matteo et al. | 250/558 |
| 3,936,649 | 2/1976 | Di Matteo et al. | 250/558 |

*Primary Examiner*—John K. Corbin
*Assistant Examiner*—R. A. Rosenberger

*Attorney, Agent, or Firm*—Watson, Leavenworth, Kelton & Taggart

[57] ABSTRACT

The spatial locations of points defining a specular surface are determined by disposing the specular surface in the field of view of a lens and by using the specular surface to view by reflection an irradiated reference surface disposed successively in different positions. Reference surface indicia viewed in common line of sight relation to each specular surface point in such different positions of the reference surface are identified. Radiant energy reflected by a specular surface point through the lens node and the location of the lens node defines a further line in space. The intersection of this further line and such line of sight defines the spatial location of such specular surface point. Photographic records made with the reference surface in such different positions contain representations of reflected radiant energy for all specular surface points in the field of view of the lens and in line of sight relation to the reference surface.

18 Claims, 11 Drawing Figures

METHOD FOR DETERMINING THE SPATIAL LOCATION OF POINTS ON A SPECULAR SURFACE

FIELD OF THE INVENTION

This invention relates generally to the reproduction of objects in three dimensions and more particularly to methods and apparatus for identifying the spatial locations of points defining the surfaces of specular objects.

BACKGROUND OF THE INVENTION

In U.S. Pat. No. 3,866,052, commonly-assigned herewith, the spatial locations of object surface points are determined by direct irradiation of a surface in a practice wherein segments of a projection field inclusive of the surface are selectively irradiated and a record made of the irradiated surface. In its principal practice, the U.S. Pat. No. 3,866,052 provides for subdividing the projection field and for successively projecting light into the subdivisions with individual photographs being made through a common fixed lens on each light projection. The line of sight between the lens node and the photographic representation of a surface point identifies a spatial line which extends to the actual surface point. The plane, with which such spatial line intersects to spatially locate the point, is identified by the selective presence or absence of a photographic representation of the point in the entire series of photographs. The spatial location of the lens node, if unknown, may be derived photographically by the use of discernible indicia in known spatial locations and reticle structure defining a reference surface with which the indicia are photographed as disclosed in U.S. Pat. No. 3,936,649, also commonly-assigned herewith.

In practice of the U.S. Pat. No. 3,866,052 method, object surface character is of significance. Thus, while surface reflectivity is required in order to obtain images of surface points in the photographs, various surfaces have reflectance characteristics which are specular or near-specular, and accordingly do not lend themselves to ready spatial location analysis by the U.S. Pat. No. 3,866,052 practice. Specular reflection is one in which a beam of light appears, after reflection, to proceed from an image of the light source existing in the reflecting surface, e.g., a mirror.

SUMMARY OF THE INVENTION

The present invention has as its object the provision of methods and apparatus for use in identifying the spatial locations of points defining the surfaces of specular objects.

In attaining the foregoing and other objects, the invention establishes a practice wherein a reference surface is irradiated in first and second mutually non-coplanar locations, in both of which locations the reference surface is, in at least a part thereof, in radiant energy-issuing relation to points of a specular surface of interest. The reference surface includes discernible indicia arranged therein in known positional pattern and is either itself encoded or encoded during irradiation such that the indicia are uniquely identifiable. From photographs made through, or detection of radiant energy passing through, the node of a lens field of view inclusive of the specular surface point, reference surface indicia in identical line of sight relation to each specular surface point are identified. Such line of sight constitutes one of two intersecting lines defining the spatial location of such specular surface point. The other such intersecting line is defined by the lens node location and the photographic representation of radiant energy passing through the lens node as reflected by such specular surface point.

The foregoing and other objects and features of the invention will be further evident from the following detailed description of preferred practices and embodiments of the invention and from the drawings wherein like parts are identified by like reference numerals throughout.

DETAILED DESCRIPTION OF PREFERRED PRACTICES AND EMBODIMENTS

Figure 1:
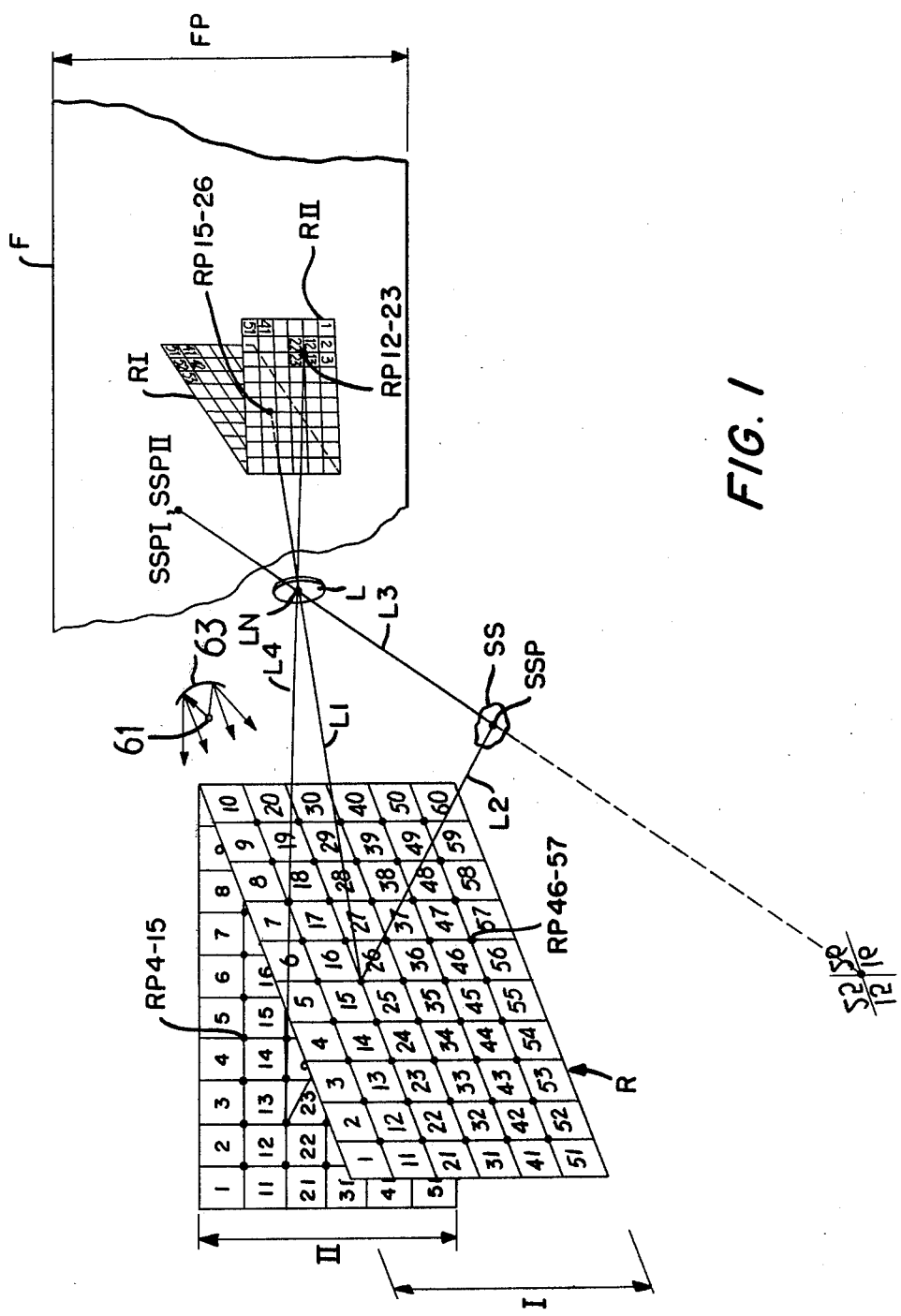
FIG. 1 illustrates a specular surface in line of sight relation with a recording lens node and with an illuminated reference surface shown in plural mutually non-coplanar locations.

In FIG. 1, a portion of specular surface SS of an object is shown with point SSP thereof in the field of view of lens L having lens node LN. A film strip or film plate F is disposed in the focal plane FP of the lens. A reference surface R is shown leftwardly of surface SS and comprises a matrix of horizontal and vertical lines having points of intersection, as highlighted by the illustrated dots, constituting discernible indicia. The surface is desirably Lambertian, i.e, when illuminated, as by light source 61 and reflector 63, the reference surface has the same brightness in any viewing direction.

Reference surface R is encoded in FIG. 1 by numeric identifiers 1 through 60. Using a rightward diagonal convention for convenience, the indicium in the uppermost horizontal dot row and in the fourth most leftward vertical dot column is shown as RP (reference point) 4-15. The indicium in the lowest dot row, sixth most leftward column is shown as RP 46-57.

With reference surface R illuminated in disposition in plane I of FIG. 1 and in the field of view of lens node LN, the images resulting in the lens focal plane are of two varieties, one created by the reference surface pattern viewed directly via lens L and the other being the portion of the reference surface pattern viewed indirectly by reflection via specular surface SS and reflected thereby to lens L. The former pattern, resulting from direct viewing, is outlined as first reference image RI and the latter pattern, resulting from indirect viewing, is identified as first specular surface point image SSPI.

Figure 2:
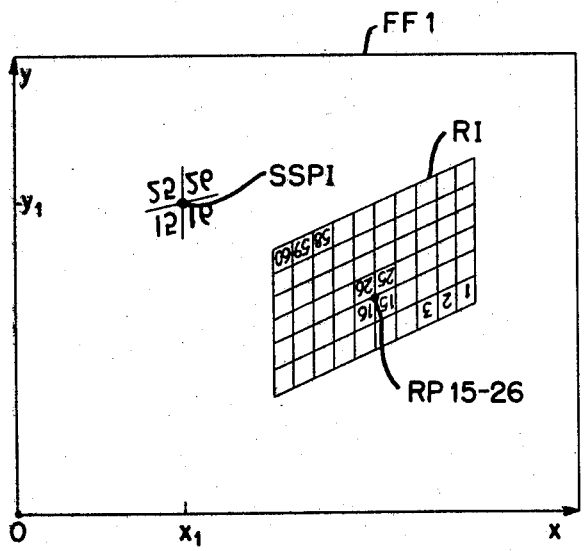
FIGS. 2 and 3 depict photographs made with the reference surface within the lens field of view in FIG. 1.

As is shown by FIG. 2, which is a photographic record FF1 made on such illumination of the reference surface in plane I, the direct pattern includes identifiers defining all indicia of reference surface R including RP 15-26. The indirect pattern is inclusive of indentifiers also defining reference point RP 15-26, but separate from and not in registry with definition thereof in the direct pattern. The positional coordinates of such separate reference point RP 15-26, which is SSPI, the image of the specular surface point in the photographic record, are $x_1$ and $y_1$ with respect to film frame origin O. As shown in FIG. 1, the photographic representation of RP 15-26 in registry with the representation of the reference surface arises from direct viewing along line L1. The separate photographic representation of RP 15-26 (SSPI) arises from lines L2 (reference surface to specular surface) and L3 (specular surface to lens). While image RI has inverted and order-reversed numeric identifiers, by action of lens L, the reference pattern portion of SSPI is further mirror-reversed by the specular surface. Thus, the SSPI, RP 15-26, is shown mirrored in the film frame. To facilitate an understanding of the lens and mirror number reversals, RP 15-26 is shown in FIG. 1 at the extremity of the broken portion of line L3 as it would be seen by direct viewing of the specular surface at lens L.

Figure 3:
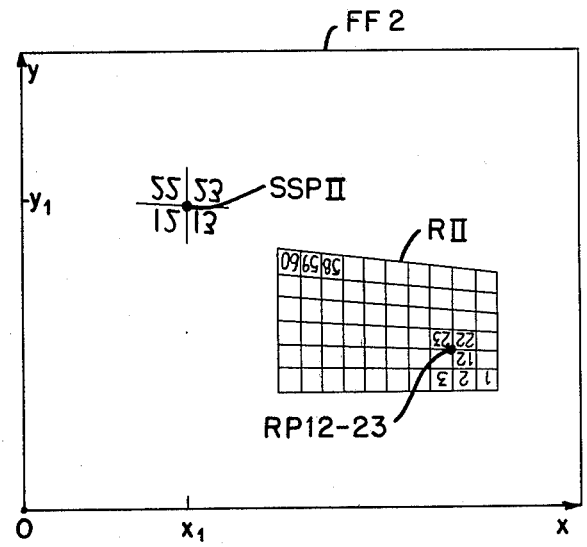

In further practice in accordance with the invention, reference surface R is now rotated about its rightward end into disposition in plane II, or otherwise moved into non-coplanar relation to its prior disposition. On illumination of the reference surface in plane II, light passing through lens node LN is again of two varieties, one being the pattern viewed directly from the reference surface to lens L, shown as RII in FIG. 1 and in photographic record FF2 of FIG. 3, and the other being the reference pattern viewed indirectly via specular surface SS and reflected thereby to lens L, shown as SSPII. The latter pattern includes identifiers for reference surface point RP 12-23 arising from lines L2 and L3 of FIG. 1 and is accordingly spatially coincident with SSPI of FIG. 2, having film frame positional coordinates $x_1$, $y_1$. Pattern RII is inclusive of all reference surface points, RP 12-23 thereof arising from direct viewing of the reference surface along line L4 of FIG. 1.

The spatial location of specular surface point SSP may now be identified simply by reconstruction of lines L2 and L3 to determine the point of intersection thereof. Line 12 is readily constructed since two points thereon have known spatial location, namely, reference point RP 12-23 in plane II and reference point RP 15-26 in plane I. With the spatial location of lens node LN known and the coordinates $x_1$, $y_1$ of the image of specular surface point SSP known in focal plane FP, two points are also known which define line L3.

Figure 2A:
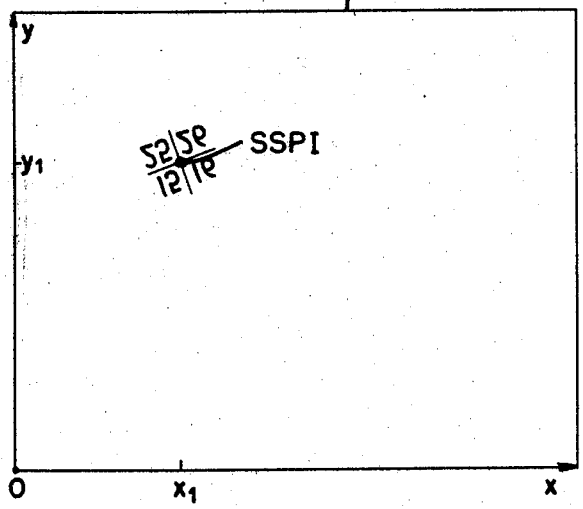
FIGS. 2(a) and 3(a) show photographs made with the reference surface outside the lens field of view in FIG. 1.
Figure 3A:
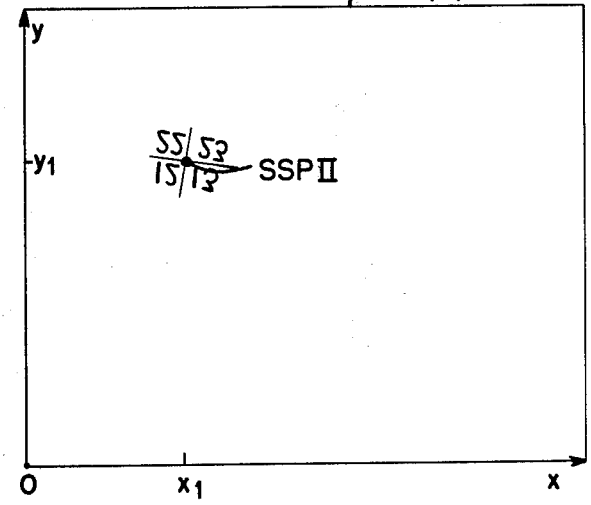

FIGS. 2(a) and 3(a) result from practice of the foregoing method with reference surface R shielded from the field of view of lens L and in line of sight relation to specular surface SS. Considering film frame FF1(a), SSPI (RP 15-26) is shown without accompanying showing of reference surface image RI. Film frame FF2(a) likewise depicts SSPII (RP 12-23) without accompanying showing of reference surface image RII. As will be appreciated, this modified practice facilitates identification of the reference surface indicia in common line of sight relation to the specular surface point since such indicia are the sole contents of the photographic records. The modified practice is not a requirement, however, since directly viewed reference surface points having the same film frame positional coordinates will not produce spurious data. Referring to FIG. 1 in this respect, line L4 contains reference point RP 7-18 (plane I) in addition to its originating reference point RP 12-23 (plane II). Accordingly, these points will give rise to points identically disposed in successively-made film frames. In effect, this data places lines L2 and L3 coincident with line L4 and such successive data is thereby dismissable as not defining intersecting lines. While thus not yielding data for use in locating the specular surface point of interest, this data has use in locating lens node LN. Thus, the intersection of the line so defined by RP 12-23 and RP 7-18 with another line determined from direct viewing of the reference surface in successive positions will define the spatial location of the lens node.

While reference surface R is encoded in FIG. 1 by use of numeric identifiers, such identifiers may appear distorted in the photographic records due to the local curvature of the specular surface and recognition thereof can be onerous where the distortion is extensive. Under such conditions, the reference surface is provided with the discernible indicia in known position, as by the illustrated horizontal-vertical line matrix, but without numeric identifiers, as shown in FIG. 7 at R'. Reference surface encoding is accomplished during the irradiation steps, as now discussed, by use of projection mask members such as shown in FIGS. 4(a) and 4(b).

Figure 4A:
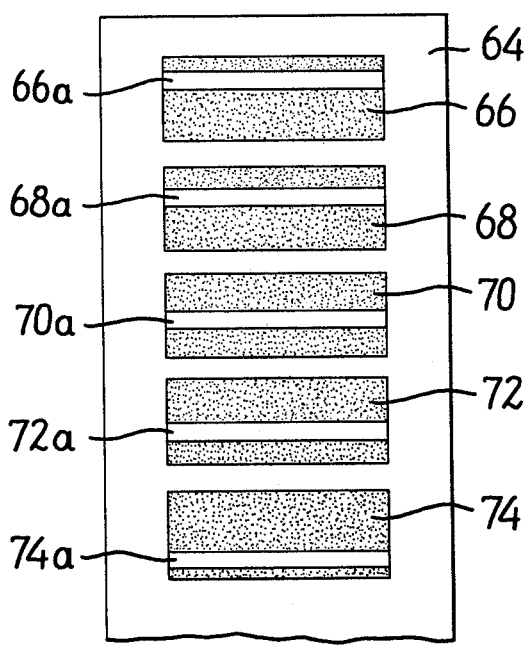
FIGS. 4(a) and 4(b) show projection masks for use in encoding reference surfaces during the illumination thereof.
Figure 4B:
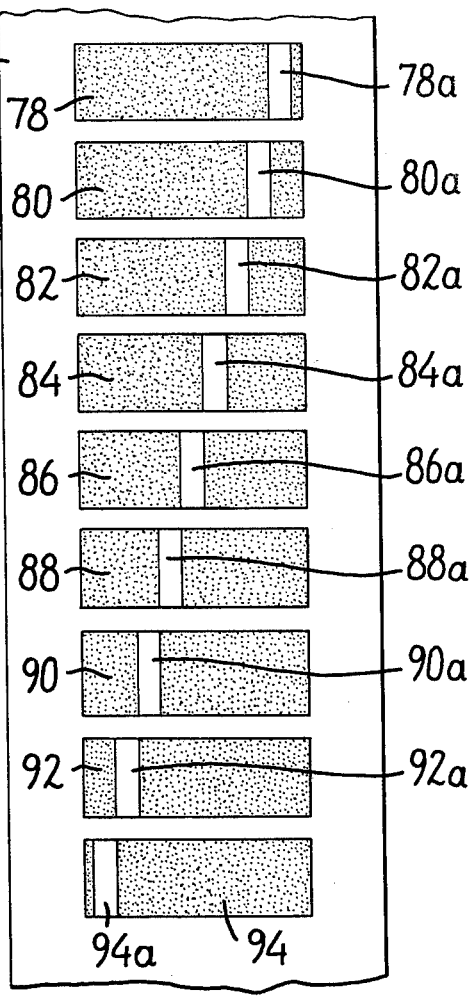

Mask member 64 of FIG. 4(a) includes masks 66, 68, 70, 72 and 74, having light-transmissive parts or zones 66a through 74a successively vertically staggered. On registry of mask 66 with a projector, zne R'-66 (FIG. 6) is illuminated, i.e., the horizontal portion of reference surface R' inclusive of the uppermost row of indicia. Masks 68, 70, 72 and 74 provide illumination of FIG. 6 zones R'-68, R'-70, R'-72 and R'-74, respectively, when separately registered with the projector. Mask member 76 of FIG. 4(b), which may be a continuation of mask member 64, includes masks 78 through 94, has light-transmissive parts 78a through 94a successively horizontally staggered. On registry of mask 78 with the projector, zone R'-78 (FIG. 6) is illuminated, i.e., the vertical portion of reference surface R' inclusive of the most rightward column of indicia. Masks 80 through 94 provide illumination of zones R'-80 through R'-94, respectively, when separately registered with the projector.

Figure 6:
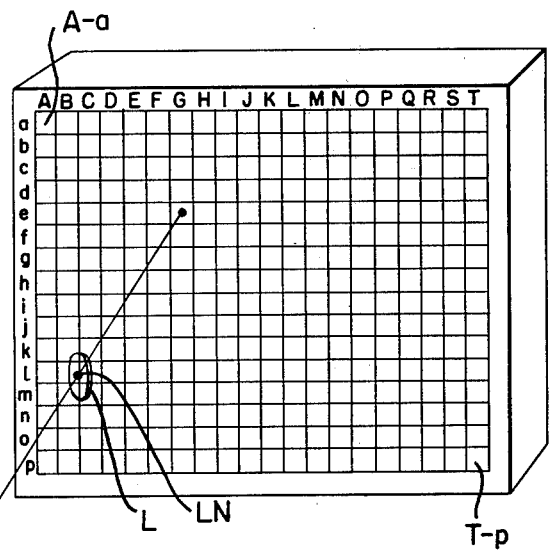
FIG. 6 shows a specular surface in line of sight relation with both a reference surface and the lens node of detector apparatus.

In practice using mask members 64 and 76, and with reference surface R' of FIG. 6 in plane I of FIG. 1 and shielded from lens L, the reference surface is illuminated successively through masks 66–74 and a photographic record made at each such vertically-stepped illuminating step. The surface is then illuminated successively through masks 78 through 94 and a succession of horizontally-stepped photographic records is made. On examination of the series of five vertically-stepped records, only the second-made record evidences a specular surface reflection. From the series of nine horizontally-stepped records, the fifth-made record along indicates a specular surface reflection. This record-provided information identifies the indicium in reference surface R', defined by the intersection of the second uppermost horizontal line and the fifth most leftward vertical line, as a first point of the line of sight extending from the reference surface to specular surface point SSP.

The foregiong practice is now repeated with reference surface R' in plane II of FIG. 1, yielding specular surface reflections in the second-made vertically-stepped and eighth-made horizontally-stepped records. This record-provided information identifies the indicium in reference surface R', defined by the second uppermost horizontal line and the eighth most leftward vertical line, as a second point of the line of sight extending from the reference surface to specular surface point SSP.

The two indicia thus identified define line L2, as in the FIG. 1 case, and line L3 is determined from the lens node spatial coordinates and the $x, y$ coordinates of the specular surface point in the focal plane. The practice set forth in commonly-assigned U.S. Pat. No. 3,936,649, incorporated by this reference thereto, may conveniently be employed to determine the spatial location of the lens node, if unknown, and may also be simultaneously employed to remove distortions present in the viewing lens.

The advantage gained in encoding the reference surface during illumination is that distortion in photographic records does not impair identification of indicia in the records. Such record distortion is evidenced simply in the non-uniformity of representations of the mask zones. The zones themselves are, however, readily distinguishable from adjacent zones.

The masking arrangement shown in FIG. 2 of commonly-assigned U.S. Pat. No. 3,866,052 may also be used to encode the reference surface. Such U.S. Pat. No. 3,866,052 to which incorporating reference is hereby made, shows a masking arrangement used for other purposes therein, but suitable for the encoding purpose herein. Horizontally-disposed light transmissive areas of the masks therein lend themselves to the generation of row digital signals indicative, by number of digits, of the number of records made, and, by the presence of ones and zeros, of the records containing and not containing representation of the specular surface point. Like vertically-disposed mask light-transmissive areas are constructed in adapting the U.S. Pat. No. 3,866,052 masking arrangement to use in the subject invention for generating column digital signals. Based on such binary coding of the masks in the U.S. Pat. No. 3,866,052, a relatively small number of photographs provide complete information of a substantially large number of area subdivisions in the reference surface. Thus, ten photographs provide information for one thousand subdivisions.

Figure 5:
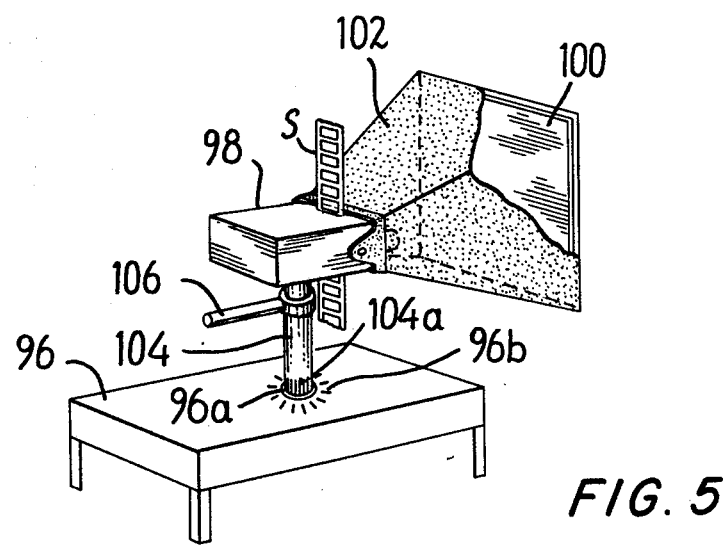
FIG. 5 is a perspective view of projection apparatus for use in practicing the invention.

FIG. 5 illustrates a projector system for use in practicing the foregoing methods, comprising support table 96, projector 98, rear-illuminated screen 100 and opaque screen housing 102. A slide S incorporating any of the foregoing masks is inserted in projector 98 for projection onto screen 100. The reference surface indicia may be inscribed on or otherwise applied to screen 100 or may be incorporated in slide S. Projector support shaft 104 is supported for rotation by bearing 96a seated in table 96 and may be rotated by mechanical input to positioning arm 106. Graduations 104a and 96b are provided, respectively, on shaft 104 and the surface of table 96 for rotating screen 100 into predetermined positions.

While the foregoing discussion has generally involved the making of records during reference surface illumination, and particularly photographic records, the invention may be practiced in all of its foregoing aspects by the use of an on-line detector unit providing electrical read-out of the foregoing photographically observed information relating to object-defining lines in space. In FIG. 6, such apparatus is shown in the form of a matrix of individual detecting elements A-$a$ to T-$p$, which may comprise photocells or the like. An individual photocell output signal will identify a reference surface point reflected by the specular surface and output signals from groups of photocells will identify the reference surface encoding pattern where the reference surface is in direct viewing relation to the photocellarray as is directly analogous to above-discussed film usage.

While evident, it should be noted that the reflected energy has definition in accordance with the invention where it does not result from plural specular surface reflections preceding its incidence on the collecting lens.

In the foregoing practices of the invention, a record was made, or detector examination was made, of radiant energy resulting from projection through a then fixedly positioned mask. In further practice now discussed, a mask is displaced relative to the reference surface and radiant energy reflected by the specular surface is examined on such mask movement.

Figure 7A:
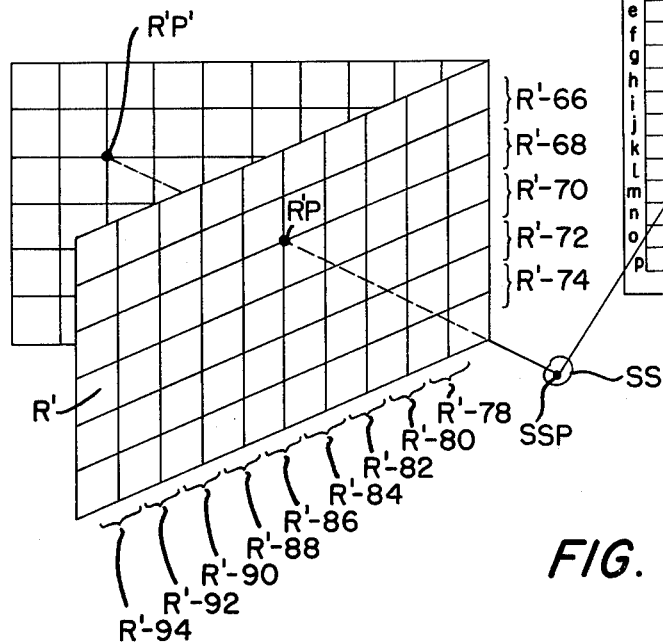
FIG 7(a) is a sectional view as seen from plane VII(a)—VII(a) of FIG. 7.
Figure 7A:
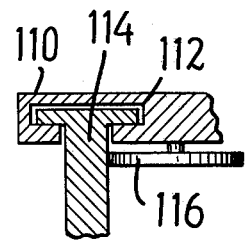
Figure 7:
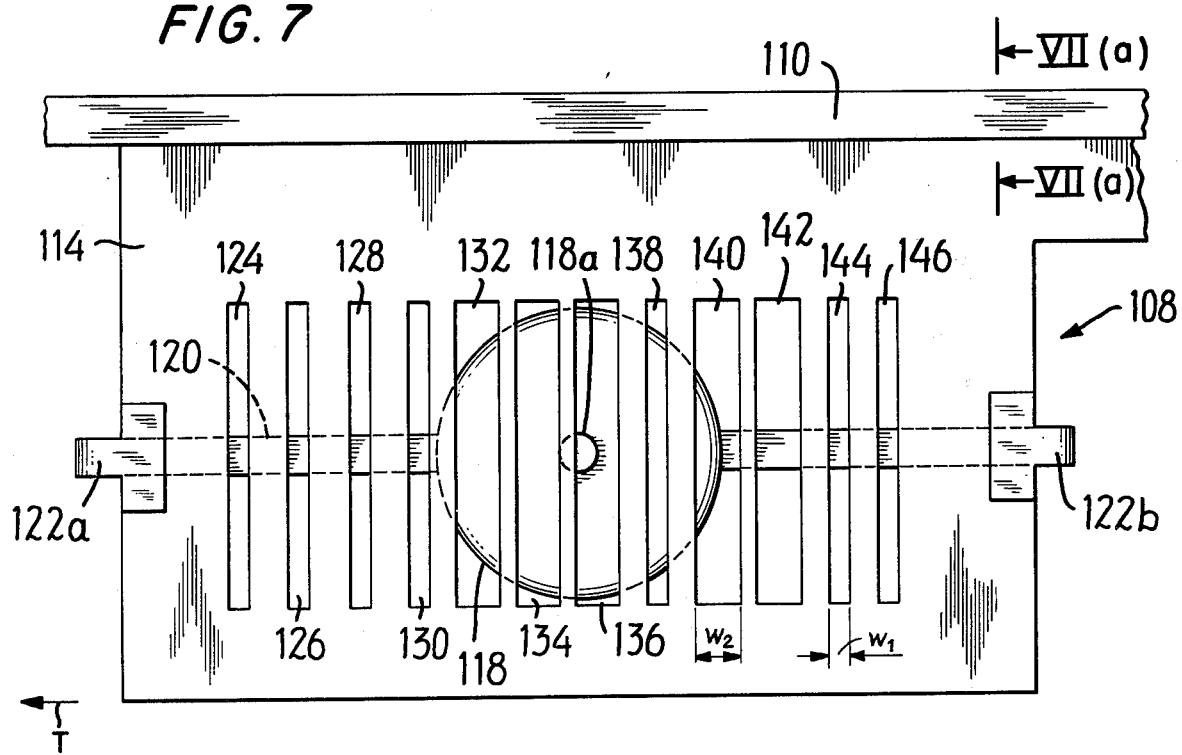
FIG. 7 illustrates a further embodiment of mask and projection apparatus used therewith.

In FIGS. 7 and 7(a), apparatus 108 includes an overhanging support 110 adapted by its interior track 112 to receive a mask member 114 and to support the same for translation along translation axis T. Drive discs 116 are selectively rotatable to so translate member 114 on energization of an electric motor and drive system (not shown). A light source 118, which may include a lamp 118a and lens arrangement, is supported by frame 120 and ribs 122a and 122b for joint translation with mask member 114. A row of light-transmissive zones or parts 124–146 is provided in the mask member. As indicated, certain zones are of width $W_1$ and others of greater width $W_2$. Zones of width $W_1$ are considered zeros and zones of width $W_2$ are considered ones. Reading successively from zone 124 through the zone 146, the shift code 000011101100 is observed. Mask 114 is arranged such that its zone 124 illuminates zone R'-78 of reference surface R' of FIG. 6. Mask zones 126–140, at the same time, illuminate zones R'-80 through R'-94, respectively. Mask zones 142, 144 and 146 are not in registry with reference surface R' in this initial alignment phase of practice, but do register with the reference surface in the course of mask movement, for purposes discussed below.

With such alignment phase established, a lens is arranged in viewing relation with specular surface SS, as in FIG. 6, and a single photocell is arranged in line-of-sight relation with the object surface point SSP through the lens node. Mask member 114 is now displaced as in FIG. 7, leftwardly along axis T until its final zone 146 traverses through reference surface zone R'-78. The pattern of the electrical output signal of the photocell, i.e., its current/voltage change characteristic with time, is observed during such mask member translation and will be indicative uniquely of the one of the reference surface column zones in radiant energy exchanging relation with point SSP. Thus, assuming the situation in FIG. 6 to apply with the reference surface in its forward position, and reference surface point R'P to be in line-of-sight relation with point SSP, the photocell output signal pattern will follow the pattern from mask zones 132–146, i.e., 11101100. The first four bits of such signal, namely 1110, uniquely identify zone R'-86 as the vertical column containing the reference surface point of interest. To identify the row of such reference surface point, as among zones R'-66 through R'-74, the apparatus of FIG. 7 is rotated in position through 90° and zone 124 thereof is aligned with reference surface zone R'-66. The translation practice is repeated with mask member 114 now translated vertically and the photocell output observed.

The foregoing practice is repeated with reference surface R' in its rearward FIG. 6 position, the horizontal and vertical translations of the mask identifying reference surface point R'P' as the second of the reference surface points of interest. These reference surface points identify a first known line of residence of point SSP. The line joining the photocell and the lens node defines any other line of residence of point SSP and the intersection of these lines spatially locates point SSP.

As for mask zones 142–146, not in registry with any column of the reference surface in the alignment stage, they serve to complement mask zone 140 in generating a photocell output signal pattern identifying the reference surface column in initial registry with mask zone 140 as the column containing the reference point of interest.

In facilitating an understanding of the invention, the foregoing methods have been described in connection with the determination of the spatial location of a single specular surface point. As will be appreciated, the entirety or continuum of points defining the total specular surface of an object or a part thereof of interest is locatable in space by practice under the invention. Thus, the photographic records containing SSPI and SSPII also contain representations of radiant energy reflected to the lens from specular surface points adjacent point SSP and reference surface numeric indicia, or encoded pattern content, associated with such adjacent points. The photographic records as made above for the first and second reference surface positions are examined for change in content at common coordinate locations therein other than $x_1$, $y_1$ to identify intersecting lines establishing the spatial location of such adjacent specular surface points.

While the foregoing discussion and showings of shift code-encoded masks relates to masks having width-enlargements to define one-zero differentiation, other forms of encoding may be used, for example, different spacings between projection zones, or subzones within zones (two zones for one, one zone for zero). Codes other than those discussed are of course contemplated, such as pseudo random array codes, Hadamaard codes, etc. While the reference surface is shown as being planar, such surface character is not requisite, since indicia may evidently be discernible and in known spatial location despite the character of the reference surface. The invention further contemplates the use of plural reference surfaces, each in different position, as contrasted to the described repositioning of a single reference surface. In this practice, the first-used reference surface is preferably removed and the second reference surface is then used. Also, it should be understood that each of such plural reference surfaces may have different indicia arrangements, since the invention requires only that any indicia used be discernible and in such known spatial locations.

The foregoing and other variations may readily be introduced in practicing the invention without departing from the scope thereof. Accordingly, the particularly discussed practices and apparatus are discussed in a descriptive and not in a limiting sense. The true spirit and scope of the invention is defined in the following claims.

What is claimed is:

1. A method for use in determining the spatial location of points on a specular surface comprising the steps of:
    (a) defining a lens field of view inclusive of said surface points;
    (b) disposing a reference surface in a first location with respect to said surface points, said reference surface having discernible indicia each of known positional coordinates;
    (c) irradiating said reference surface and detecting radiant energy passing through the lens node of said lens field of view;
    (d) positioning said reference surface in a second location with respect to said surface points and repeating step (c); and
    (e) identifying from said radiant energy detected in steps (c) and (d) indicia of said reference surface in identical line of sight relation to said surface points.

2. The method claimed in claim 1 wherein said steps (c) and (d) are practiced in part by making respective records, in a record plane of known spatial position, of said radiant energy passing through said lens node.

3. The method claimed in claim 2 wherein each such reference surface indicium is uniquely encoded and wherein said step (e) is practiced by decoding radiant energy patterns contained in said records.

4. The method claimed in claim 3 including the further step of identifying for each such surface point the spatial line extending between said lens node and said radiant energy patterns contained in said records.

5. The method claimed in claim 4 including the further step of identifying the point of intersection of said line of sight in step (e) and said spatial line, the spatial location of said point of intersection defining the spatial position of said surface point.

6. The method claimed in claim 3 wherein said reference surface indicia are uniquely encoded by discernible identifiers in said reference surface.

7. The method claimed in claim 3 wherein said reference surface indicia are uniquely encoded by such step (c) and step (d) irradiation of said reference surface.

8. The method claimed in claim 7 wherein irradiation of said reference surface is practiced by use of encoded projection mask means.

9. The method claimed in claim 8 wherein each of steps (c) and (d) is practiced by making plural records in said record plane and identifying those of such records having representations of said radiant energy passing through said lens node.

10. The method claimed in claim 1 wherein said steps (c) and (d) are practiced in part by displacing a radiant energy pattern relative to said reference surface and said specular surface.

11. The method claimed in claim 10 wherein said radiant energy pattern is an encoded pattern.

12. The method claimed in claim 11 wherein said step (e) is practiced in part by detecting change with time of radiant energy passing through said lens node.

13. The method claimed in claim 12 wherein said step (e) is practiced in part by generating an electrical signal having an amplitude-time characteristic indicative of such change in radiant energy passing through said lens node.

14. A method for use in determining the spatial location of points on a specular surface comprising the steps of:
    (a) defining a lens field of view inclusive of said surface point;

(b) disposing a reference surface in a first location with respect to said surface points, said reference surface having discernible indicia each of known positional coordinates;

(c) irradiating said reference surface and detecting radiant energy passing through the lens node of said lens field of view;

(d) positioning another reference surface in a second location with respect to said surface points and repeating step (c), such other reference surface having discernible indicia each of known positional coordinates; and (e) identifying from said radiant energy detected in steps (c) and (d) indicia of said reference surfaces in identical line of sight relation to said surface points.

15. The method claimed in claim 14 wherein said steps (c) and (d) are practiced in part by making respective records, in a record plane of known spatial position, of said radiant energy passing through said lens node.

16. The method claimed in claim 15 wherein each such reference surface indicium is uniquely encoded and wherein said step (e) is practiced by decoding radiant energy patterns contained in said records.

17. The method claimed in claim 16 including the further step of identifying for each such surface point the spatial line extending between said lens node and said radiant energy patterns contained in said records.

18. The method claimed in claim 17 including the further step of identifying the point of intersection of said line of sight in step (e) and said spatial line, the spatial location of said point of intersection defining the spatial position of said surface point.

* * * * *